US007185498B1

(12) United States Patent
Jonsson

(10) Patent No.: US 7,185,498 B1
(45) Date of Patent: Mar. 6, 2007

(54) MODULAR GAS TURBINE

(75) Inventor: Bertil Jonsson, Bjarred (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

(21) Appl. No.: 10/707,557

(22) Filed: Dec. 20, 2003

Related U.S. Application Data

(63) Continuation of application No. PCT/SE02/01235, filed on Jun. 20, 2002, now abandoned.

(30) Foreign Application Priority Data

Jun. 28, 2001 (SE) .................................... 0102325

(51) Int. Cl.
*F02C 7/20* (2006.01)
*F02C 7/28* (2006.01)

(52) U.S. Cl. ........................ 60/796; 60/798; 60/39.511

(58) Field of Classification Search .................. 60/796, 60/797, 798, 799, 800, 39.511
See application file for complete search history.

(56) References Cited

U.S. PATENT DOCUMENTS 2,625,013 A * 1/1953 Howard et al. ............... 60/800
3,077,074 A * 2/1963 Collman et al. .............. 60/796
3,167,914 A * 2/1965 Savonuzzi ............... 60/39.512
3,761,205 A 9/1973 Cronstedt
3,823,553 A * 7/1974 Smith .......................... 60/791
4,083,180 A 4/1978 Thompson et al.
4,114,368 A 9/1978 Davis et al.
4,307,568 A * 12/1981 Huller et al. ............ 60/39.511
4,534,700 A * 8/1985 Horler et al. ............... 415/135
5,127,606 A * 7/1992 Chan et al. ................... 60/797
6,131,384 A * 10/2000 Ebel ............................ 60/797
6,309,177 B1 * 10/2001 Swiderski et al. ....... 415/173.2

* cited by examiner

*Primary Examiner*—Ted Kim
(74) *Attorney, Agent, or Firm*—Novak Druce + Quigg LLP

(57) ABSTRACT

Method and arrangement for providing a gas turbine (1) having a duct (11) for carrying gas from a gas turbine inlet (9) to a gas turbine outlet (10) and an outer housing (19, 20, 21) arranged radially outside a wall structure (12, 13, 14), which defines the radially outer limits of the gas duct (11). The gas turbine (1), between the inlet (9) and outlet (10), is constructed from a plurality of modules (6, 7, 8), each of which constitutes a part of the outer housing (19, 20, 21) and a part of the wall structure (12, 13, 14) of the gas duct. At least two adjacent parts of the wall structure (12, 13, 14) of the gas duct are arranged at a distance from one another. At least one pressure dividing element (27, 33, 42) is provided and configured to divide off a pressure area (P1, P3, P4, P5, P6) in the gas duct (11) at the junction between the two adjacent parts of the wall structure (12, 13, 14) from another pressure area (15, 16, 17, 18) situated between the wall structure (12, 13, 14) of the gas duct and the outer housing (19, 20, 21). The pressure dividing element (27, 33, 42) consists of a pressure wall extending from the wall structure (12, 13, 14) of the gas duct to the outer housing (19, 20, 21).

11 Claims, 3 Drawing Sheets

MODULAR GAS TURBINE

CROSS REFERENCE TO RELATED APPLICATIONS

The present application is a continuation patent application of International Application No. PCT/SE02/01235 filed 20 Jun. 2002 now abandoned which was published in English pursuant to Article 21(2) of the Patent Cooperation Treaty, and which claims priority to Swedish Application No. 0102325-8 filed 28 Jun. 2001. Both applications are expressly incorporated herein by reference in their entireties.

BACKGROUND OF INVENTION

1. Technical Field

The present invention relates to method and arrangement for providing a gas turbine that includes a duct for carrying gas from a gas turbine inlet to a gas turbine outlet and an outer housing arranged radially outside a wall structure which defines the radially outer limits of the gas duct. The gas turbine, between the inlet and outlet, is constructed from a plurality of modules, each of which includes a part of the outer housing and a part of the wall structure of the gas duct. At least two adjacent parts of the wall structure of the gas duct are arranged at a distance from one another. At least one pressure dividing element provided that is configured to divide off a pressure area in the gas duct at the junction between the two adjacent parts of the wall structure from another pressure area situated between the wall structure of the gas duct and the outer housing.

2. Background

Gas turbines of the aforementioned type are used, for example, as engines for vehicles and aircraft, as prime movers in ships, and in power stations for the generation of electricity.

Manufacturing the gas turbine in modules, which are then assembled into a complete gas turbine, is already known in the case of gas turbines having a compressor driven by a turbine and a combustion chamber arranged between them, together with a power turbine arranged down-stream of the turbine. In this case, each of the modules carries various main components of the gas turbine, such as compressor, combustion chamber, turbine and power turbine. A gas duct which carries gas from one main component to another furthermore extends through the modules.

Manufacturing the gas turbine in modules facilitates both assembly and servicing of the gas turbine.

One problem in connection with assembly of the modules is obtaining satisfactory tightness at the transition of the gas duct between two adjacent modules. At the gas duct transition from a first module to a second module, sealing elements of the metal sealing ring type are generally used. The sealing rings are in this case arranged in radial grooves in the gas duct wall structure of the first module and protrude somewhat outside the outer circumferential surface of the wall structure. In the end section facing the gas duct of the first module, the gas duct wall structure of the second module is designed with an inside diameter somewhat larger than the diameter of the outer circumferential surface of the first gas duct. This makes it possible to introduce the gas duct of the first module into the gas duct of the second module, the sealing rings finishing up in a clamped position between the outer and inner surfaces respectively of the two ducts.

One problem with the aforementioned type of sealing element, however, is that they are never completely tight and that they are greatly affected by circularity defects in the seal positioning, a condition which often occurs in gas turbine engines due to the high temperatures and temperature differentials which occur in these engines. Another problem in connection with this type of seals is that they only assume their final sealing position when the modules are fully assembled, which means that it is not possible to visually verify that the seals have assumed a correct position.

SUMMARY OF INVENTION

An object of the present invention is to provide a sealing arrangement in a gas duct extending through a modular gas turbine, and by means of which satisfactory tightness is achieved at high temperatures and temperature differentials, and which makes it possible to visually verify that the sealing arrangement is correctly fitted in that it has assumed its sealing position before final assembly of the gas turbine.

According to a preferred embodiment of the invention, the pressure wall is connected to the wall structure of the gas duct and the outer housing of one and the same module by means of a bolted connection. This ensures that the module is pressure-tight before it is assembled with the next module. This furthermore permits relatively easy dismantling of the pressure wall, for example when servicing components such as bearings arranged in the module.

According to a further preferred embodiment, the pressure wall, on an outer circumference thereof, is designed with a radial flange through which the bolted connection extends. The fact that the flange is intended to be clamped between the outer housing of two adjacent modules when assembling the gas turbine means that the flange functions as a seal packing between the modules.

According to a further preferred embodiment, the pressure wall is designed with at least one bellows-shaped section. This improves the ability of the pressure wall to absorb movements caused, for example, by thermal expansion and transient gas pressure variations.

According to a further preferred embodiment, the pressure wall is made of metal. This gives the pressure wall equivalent thermal expansion characteristics to the gas turbine allowing it to follow movements of the gas turbine due to temperature variations.

BRIEF DESCRIPTION OF DRAWINGS

The invention will be described below with reference to preferred exemplary embodiments and the accompanying drawings, in which.

DETAILED DESCRIPTION

Figure 1:
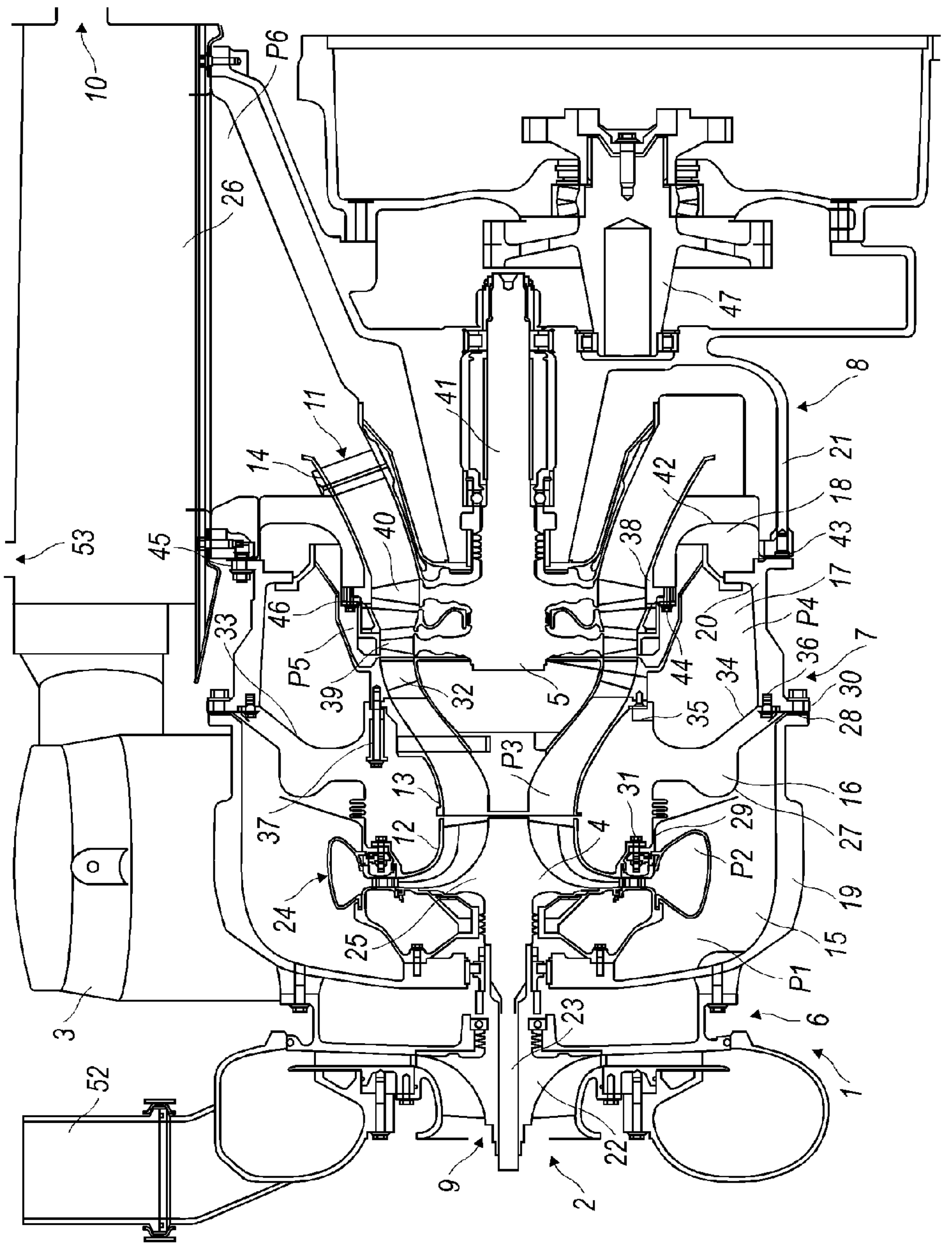
FIG. 1 is a diagrammatic side view showing a cross section of a modular gas turbine provided with pressure walls configured according to the present invention.

FIG. 1 shows a diagram of a modular two-shaft gas turbine 1 comprising (including, but not limited to) main components that include a compressor 2, a combustion chamber 3, a turbine 4 and a power turbine 5. The gas turbine 1 comprises three modules: a gas generator module 6, a center module 7 and a drive module 8, each of which will be described in more detail below. A gas duct 11 for carrying gas from one main component 2, 3, 4, 5 to another extends through modules 6, 7, 8 of the gas turbine 1 from a gas turbine inlet 9 to a gas turbine outlet 10. The gas duct 11 is defined by a wall structure 12, 13, 14 which divides the gas duct 11 off from the spaces 15, 16, 17, 18 that are formed inside the outer housings 19, 20, 21 of the gas turbine modules.

The gas generator module 6 comprises a compressor 2 driven by a turbine 4. The compressor 2 comprises a compressor rotor 22 that is rotationally fixed by way of a shaft 23 to a turbine rotor 25 arranged in a turbine housing 24. The compressor 2 is connected upstream to the gas turbine inlet 9. The air compressed by the compressor 2 is fed to the inlet of the combustion chamber 3 in a line 52 via a recuperator 26, the function of which will be described later, in which it has the pressure P1. In FIG. 1, the line 52 is terminated, but in actual fact it is connected to the recuperator 26 via the opening 53. In the combustion chamber 3, fuel is introduced by means of a fuel system and combustion occurs with the aid of the compressed air.

The hot combustion gases, which now have the pressure P2, are then led to the turbine 4 in which a first limited expansion of the combustion gases from the pressure P2 to the lower pressure P3 occurs in order to drive the compressor 2. A first pressure wall 27, which seals off the pressure P1 from the pressure P3, is arranged between the turbine housing, which in its extension towards the center module constitutes a part of the wall structure 12 of the gas duct, and the outer housing 19 of the gas turbine module 6. The pressure wall 27 is here formed with an outer flange 28 and an inner flange 29, which are fixed to the outer housing 19 and wall structure 12, respectively, by means of bolted connections 30, 31. The gas generator module 6, with the higher pressure P1, is thereby entirely sealed off from the inlet pressure P3 of the center module 7 without performing any “blind assembly.” The pressure wall 27 furthermore means that no sealing element is required at the transition of the gas duct 11 from the gas generator module 6 to the center module 7.

From the gas generator module 6, the working gas flows, at the pressure P3, to the center module 7. The center module 7 comprises a continuation 13 of the wall structure 12 of the gas duct 11 from the turbine housing 24. A plurality of stator blades 32, which by means of an adjusting mechanism in the space 17 can be set to various positions for guiding the working gas, are arranged in the gas duct 11. For cooling the adjusting mechanism, the center module 7 is supplied with cooling air, at the pressure P4, from a compressor. At this point, the pressure P4 is only somewhat higher than P3 and is sealed off by a second pressure wall 33 formed with an outer flange 34 and an inner flange 35, which are fixed by means of bolted connections 36, 37 to the outer housing 20 of the center module 7 and the continuation of the wall structure of the gas duct 13. The center module 7 is therefore also a pressure-tight module and no “blind assembly” is involved when connecting it either to the gas generator module 6 or to the downstream drive module 8. The pressure wall 33 furthermore means that no sealing element is required at the transition of the gas duct 13 from the center module 7 to the drive module 8.

From the center module 7, the working gas, now at the pressure P5 after having passed through the stator blades 32, flows on to the drive module 8 which comprises the power turbine 5, in which the final expansion of the combustion gases occurs down almost to atmospheric pressure P6. The power turbine 5 here comprises two power turbine rotors 39, 40 arranged in a power turbine housing 38, which are rotationally fixed to an output shaft 41, which is the same as the output shaft of the gas turbine. The extension of the power turbine housing 38, both up-stream and downstream, constitutes a part of the wall structure of the gas duct 11. In the same way as the first pressure wall 27 and second 33 pressure wall 33 described above, a third pressure wall 42, which seals off the pressure P5 from the pressure P6, is arranged between the power turbine housing 38 and the outer housing 21 of the drive module 8. Here, the third pressure wall 42 is formed with an outer flange 43 and an inner flange 44 that are fixed by means of bolted connections 45, 46 to the outer housing 21 and the power turbine housing 38, respectively. Here too, therefore, “blind assembly” of the gas turbine 1 is avoided.

The fact that the gas duct 11 downstream of the power turbine 5 is connected to a recuperator 26 makes it possible to recover a part of the residual heat present in the combustion gases after they have passed through the turbine 4 and power turbine 5. This residual heat is used to heat the air compressed by the compressor 2 before it reaches the combustion chamber 3, which contributes to increased efficiency of the gas turbine 1. After the combustion gases have passed through the recuperator 26, they are finally led out through the gas turbine outlet 10.

The output shaft 41 of the gas turbine 1 is in turn rotationally fixed to an intermediate shaft 47, to which the assembly that the gas turbine is intended to drive, such as a drive shaft of a vehicle, can be coupled.

Figure 2:
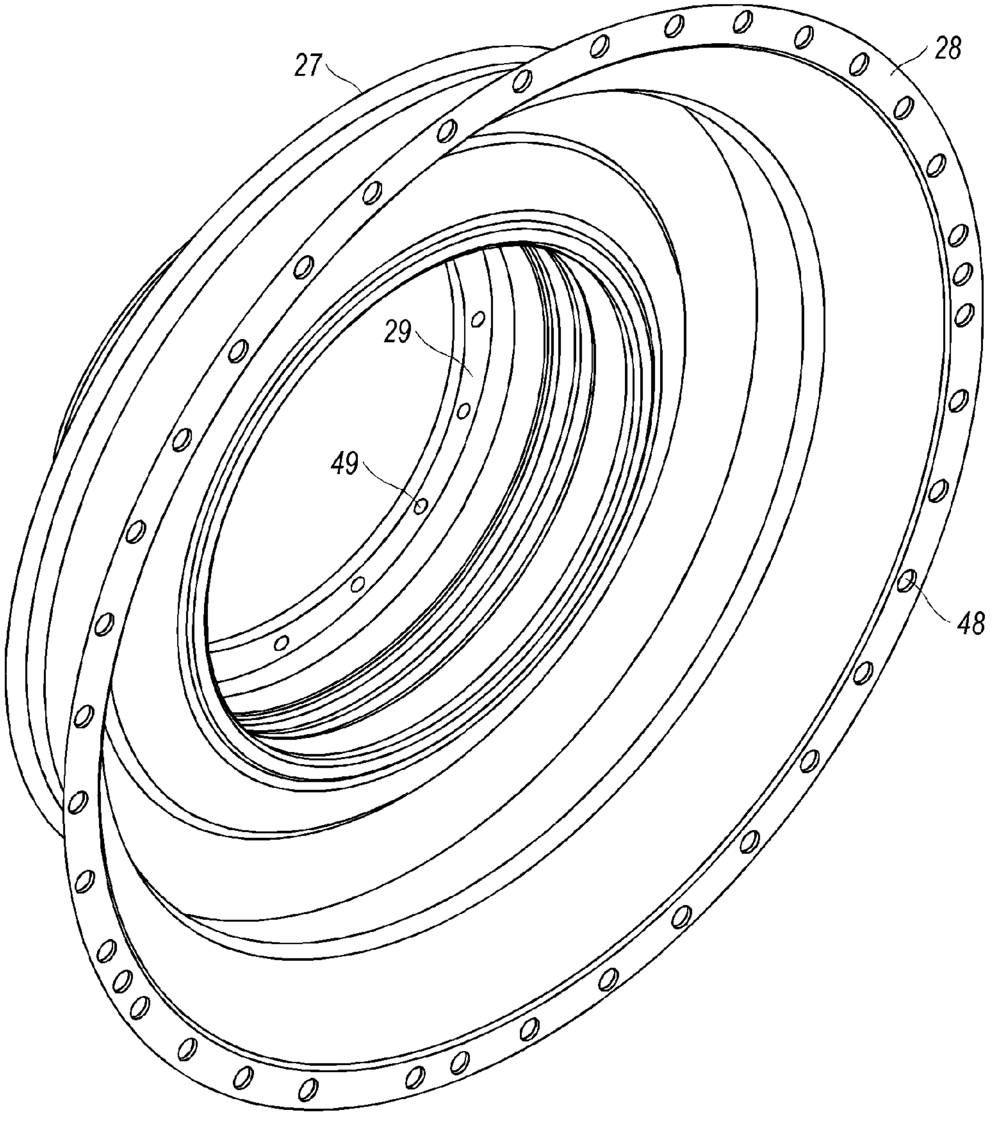
FIG. 2 is a diagrammatic perspective view of a pressure wall configured according to the present invention.

FIG. 2 shows a perspective view of a pressure wall configured according to the teachings of the present invention. For the sake of simplicity, only the aforementioned first pressure wall 27 will be described because the second pressure wall 33 and the third pressure wall 42 differ only in their geometric design. As previously described, the pressure wall 27 is formed with an outer flange 28 and an inner flange 29. The flanges are provided with a plurality of through-holes 48, 49, through which the bolted connections 30, 31 extend in order to provide a pressure-tight connection between the outer housing 19 and the pressure wall 27 and between the wall structure 12 of the gas duct and the pressure wall 27.

Figure 3:
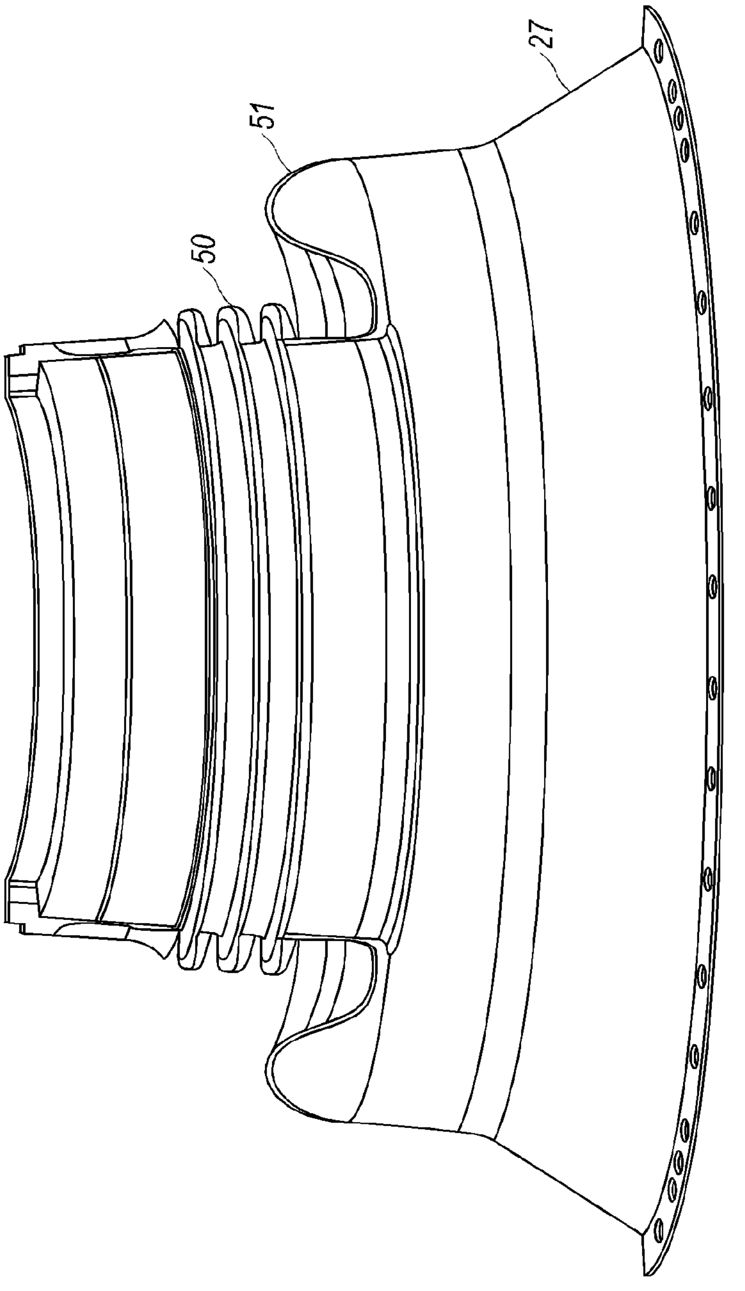
FIG. 3 is a diagrammatic side view showing a cross section of a pressure wall for a modular gas turbine configured according to the present invention.

The fact that pressure wall 27 is designed with a first bellows-shaped section 50 and a second bellows-shaped section 51 as shown in FIG. 3 permits movements of the pressure wall 27 resulting, for example, from thermal expansions and transient pressure variations of the gas flowing through the gas turbine 1.

The invention must not be regarded as being limited to the embodiment described above, a number of modifications thereof being possible without departing from the scope of the patent protection. For example, instead of the type described above, the gas turbine may be of a single-shaft type; that is to say, a gas turbine in which the shaft connecting compressor and turbine in its extension forms the output drive shaft of the gas turbine. Furthermore, there may be a greater number of compressor stages, turbine stages and power turbine stages than described above.

The invention claimed is:

1. A modularly assembled gas turbine comprising:

a plurality of individually pressure-tight modules, each of said modules being exteriorly defined by an outer housing and interiorly defined by a inner wall, said inner wall partially delimiting a gas duct that conveys compressed gas from a turbine assembly of the gas turbine through said modules;

each of said modules having a pressure-tight side wall interconnected between the respective outer housing and inner wall of the module, each pressure-tight side wall having an outer circumference that forms a flange that is bolt-connected to the respective outer housing of the module in sealing engagement therewith; and the outer circumferential flange of at least one of said pressure-tight side walls being bolt-connected between the outer housings of two adjacent modules and thereby forming a seal packing between the two respective outer housings in an assembled configuration of the gas turbine, and an exterior portion of said seal packing remains visible exteriorly of the assembled gas turbine thereby accommodating visual confirmation of the seal packing's orientation between the outer housings in the assembled configuration of the gas turbine.

2. The modularly assembled gas turbine as recited in claim 1, further comprising:

the outer circumferential flange of at least two of said pressure-tight side walls are each bolt-connected between the outer housings of two adjacent modules and thereby form a seal packing between the respective outer housings in the assembled configuration of the gas turbine, an exterior portion of each of said seal packings remains visible exteriorly of the assembled gas turbine thereby accommodating visual confirmation of the seal packings' orientation between the respective outer housings in the assembled configuration of the gas turbine.

3. The modularly assembled gas turbine as recited in claim 1, further comprising:

each pressure-tight side wall having an inner circumference that forms a flange that is bolt-connected to the respective inner wall of the module in sealing engagement therewith.

4. The modularly assembled gas turbine as recited in claim 1, wherein the pressure-tight side wall has at least one bellows-shaped section.

5. The modularly assembled gas turbine as recited in claim 1, wherein the pressure-tight side wall is made of metal.

6. The modularly assembled gas turbine as recited in claim 1, wherein said gas turbine is installed as an engine of at least one of the following: a vehicle, an aircraft, a ship and a power station for generating electricity.

7. The modularly assembled gas turbine as recited in claim 1, wherein said plurality of modules numbers three.

8. The modularly assembled gas turbine as recited in claim 7, wherein at least one of said three modules is a gas generator module.

9. The modularly assembled gas turbine as recited in claim 8, wherein said gas generator module further comprises a compressor driven by a turbine.

10. The modularly assembled gas turbine as recited in claim 7, wherein at least one of said three modules is a drive module.

11. The modularly assembled gas turbine as recited in claim 10, wherein said drive module further comprises a power turbine.

* * * * *